US006863271B1

(12) United States Patent
Clouser

(10) Patent No.: US 6,863,271 B1
(45) Date of Patent: Mar. 8, 2005

(54) APPARATUS AND SYSTEM FOR MOUNTING, ROTATING, AND HOLDING A PERSONAL WATERCRAFT

(76) Inventor: Bryan K. Clouser, 710 Walnut Ridge, Fenton, MO (US) 63026

( * ) Notice: Subject to any disclaimer, the term of this patent is extended or adjusted under 35 U.S.C. 154(b) by 0 days.

(21) Appl. No.: 10/207,312

(22) Filed: Jul. 29, 2002

Related U.S. Application Data

(60) Provisional application No. 60/308,770, filed on Jul. 31, 2001.

(51) Int. Cl.[7] .............................. B23Q 1/25; B25B 1/22

(52) U.S. Cl. ........................................................ 269/71

(58) Field of Search ............................ 269/17, 296, 60, 269/68, 69, 71; 254/134, 133, 2 R, 2 B; 414/590

(56) References Cited

U.S. PATENT DOCUMENTS 2,997,292 A * 8/1961 Lucker et al. ................ 269/17
3,218,056 A * 11/1965 Kaplan et al. ................ 269/17
4,396,343 A * 8/1983 Brewer, Jr. ................. 414/678
5,051,056 A * 9/1991 Gibbons et al. .............. 269/17

* cited by examiner

*Primary Examiner*—Robert C. Watson
(74) *Attorney, Agent, or Firm*—Kevin L. Klug

(57) ABSTRACT

A device and method for optimumly holding a personal watercraft while making repairs or improvements without damaging the watercraft. The device in its preferred form allows a personal watercraft to be held with specialized mounting sections and plates and further mounted between stands which allow the watercraft to be rotated. When mounted with the stands, the watercraft may be locked at a user desired rotational angle to make repairs or maintenance easier and more convenient to the user. The stands preferably have pivoting wheels which allow translational movement for the watercraft and stands combination.

17 Claims, 16 Drawing Sheets

APPARATUS AND SYSTEM FOR MOUNTING, ROTATING, AND HOLDING A PERSONAL WATERCRAFT

This application claims priority of Provisional Patent Application #60/308,770, filed Jul. 31, 2001.

BACKGROUND OF THE INVENTION

The present invention relates in general to a device and method for optimumly holding a personal watercraft while making repairs or improvements and more particularly, to an apparatus and system for mounting, rotating, holding, and moving a personal watercraft in a convenient and easy to use fashion.

Traditionally, in order to make repairs or otherwise access the hull of a personal watercraft, one must substantially elevate the watercraft or rest the top of the watercraft on a suitable surface. There are disadvantages to both of these methods. It is awkward and potentially unsafe for a repair technician to work underneath an elevated watercraft. Also, the configuration of a typical personal watercraft is such that setting the personal watercraft in a generally inverted position renders the watercraft susceptible to damage. Furthermore, this inverted position does not provide the stability required to properly and safely perform repairs to the watercraft nor does it allow for easy movement around the repair shop.

The art of the present invention represents an apparatus and system which allows a personal watercraft to be securely mounted upright and then rotated from 0 to or through 360 degrees for easy and safe access to the hull of said watercraft. Since a typical personal watercraft can weigh in the range of 500 to 600 pounds or more, it is very difficult to move without three or four persons. The present art apparatus allows a personal watercraft, once mounted, to be easily rotated or translationally moved by just one or two persons.

In a preferred embodiment, the apparatus generally comprises a bow mounting section, a bow shaft section, a bow absorber pad, a stern mounting plate, a stern shaft section, a stern absorber pad, a bow stand, and a stern stand. The bow mounting section and the bow shaft section are conjoined with the bow absorbing pad sandwiched therebetween. The bow shaft section rotatably mounts with the bow stand and is substantially equivalent to the stern shaft section. The stern section similarly interconnects with the aforesaid stern section components. That is, the stern mounting plate and the stern shaft section are conjoined with the stern absorbing pad sandwiched therebetween. Also, the stern shaft section rotatably mounts with the stern stand. Preferably the stern stand rotational axis is of substantially equivalent height to the bow stand rotational axis with both stands having pivoting wheels or castors at the base to provide translational movement.

With the present art, a personal watercraft is uniquely held at its bow and stern by and between the bow mounting section and stern mounting plate in such a fashion as to allow the personal watercraft to be rotated on its lengthwise axis and positionally locked on the rotational axis between said stands without damage to the watercraft. Furthermore when held as aforesaid, the personal watercraft may be moved on the repair shop floor via the action of the pivoting wheels or castors at the base of each stand.

Accordingly, it is an object of the present invention to provide a device and method for holding a personal watercraft which allows easy, convenient, and lockable rotational movement and hull repair of the watercraft.

Another object of the present invention is to provide a device and method for holding a personal watercraft which allows easy and convenient translational movement of the watercraft and device combination on the repair or maintenance shop floor.

A further object of the present invention is to provide an apparatus and system for mounting, rotating, holding, and moving a personal watercraft which may be applied to any personal watercraft without damaging the hull or other portions of the watercraft.

A still further object of the present invention is to provide the aforesaid apparatus and system in a form which is economically manufactured.

SUMMARY OF THE INVENTION

To accomplish the foregoing and other objects of this invention there is provided a device for holding a personal watercraft and method of utilizing the same. The apparatus provides for mounting, rotating, holding, and translational moving of a personal watercraft. The method of use provides a system for rotatably holding and translationally moving virtually any type of personal watercraft with a minimum of persons. With the present art, all of the aforesaid is accomplished in a safe manner without damage to the personal watercraft.

As aforesaid, in a preferred embodiment, the apparatus comprises a bow mounting section, a bow shaft section, a bow absorber pad, a stern mounting plate, a stern shaft section, and a stern absorber pad, a bow stand, and a stern stand. The bow mounting section and the bow shaft section are conjoined with the bow absorbing pad sandwiched therebetween. The bow shaft section rotatably mounts with the bow stand. The stern section similarly interconnects with the aforesaid stern section components. That is, the stern mounting plate and the stern shaft section are conjoined with the stern absorbing pad sandwiched therebetween. Also, the stern shaft section rotatably mounts with the stern stand. Preferably the stern stand rotational axis is of substantially equivalent height to the bow stand rotational axis with both stands having pivoting wheels or castors at the base to provide translational movement.

In a preferred embodiment, the bow mounting section is comprised of a top mounting plate, a front plate, a bottom mounting plate, two deep spacers, three shallow spacers, a clamping section, a bow base plate, and five bow bolts and nuts. The bow mounting section is designed to clamp onto the bow rim of a personal watercraft. The top mounting plate is generally rectangular and substantially flat and further comprises a bow edge, a front edge, two side edges, an exterior side, an interior side, and six top mounting plate holes. In a preferred embodiment, the bow edge is generally U-shaped to correspond to the shape of the bow of a personal watercraft, with the bottom of the "U" oriented towards the opposite front edge. Alternative embodiments include any configuration or shape of the bow edge which is required to fit the bow of a personal watercraft. In another alternative embodiment, the bow edge can have an attached section in the center with an integral hole which corresponds to a hole in the center of the bow rim of some watercraft and can facilitate attaching the bow mount section to those watercraft by inserting a bolt through the aforesaid holes. In operation, the five bow bolts are inserted into the top mounting plate holes and are used to facilitate the clamping of the bow rim of a watercraft.

In a preferred embodiment, the bottom mounting plate is substantially identical to the top mounting plate except that the dimension from the front edge to the bow edge is slightly longer than the top mounting clamp. The bottom mounting plate comprises a bow edge, a front edge, two side edges, an exterior side, an interior side, a bow lip, and eight bottom mounting plate holes. The bow edge of the bottom mounting plate is shaped substantially identical to the bow edge of the top mounting plate. In a preferred embodiment, a bow lip attaches to the interior side along the entire bow edge of the bottom mounting plate and comprises a smooth metallic rod which facilitates optimum clamping of the watercraft bow rim. Alternative embodiments of the bow lip include any type and shape of materials which can facilitate the clamping of the bow rim of the watercraft. All of the mounting plate holes, clamping plate holes, or base plate holes relating to the present art within this specification may be more or less than or of different size than specified in the preferred embodiment or may be eliminated completely, with clamps or other mechanical holding methods utilized for clamping and holding the mounting plates, without departing from the scope and spirit of the present invention.

In a preferred embodiment, the two deep and three shallow spacers are comprised of a generally cube-shaped piece each having a spacer hole and functioning as spacers between the top mounting plate and the bottom mounting plate with the spacers being attached to the bottom mounting plate. In an alternative embodiment, the spacers can be of any shape and quantity and attach to either the top or the bottom mounting plate. The spacers serve to limit the clamping action of the mounting plates, thereby protecting the watercraft from damage. Alternative embodiments may forego use of the spacers provided the hull of the watercraft is not damaged by the forces of the clamping mounting plates. The aforesaid shallow spacers are positioned between the top and bottom mounting plates near the bow edge of the mounting plates and the deep spacers are positioned between the top and bottom mounting plates near the front edge of the mounting plates. In a preferred embodiment, in a non-clamping condition, the deep spacers contact both the top mounting plate and the bottom mounting plate and an approximate distance of ¼ inch exists between the shallow spacers and the top mounting plate. In an alternative embodiment, the spacers can be dimensioned as required to allow secure clamping of the bow rim of a personal watercraft. The spacer hole in each of the shallow and deep spacers is capable of penetration by the bow bolt. The spacers are positioned such that a bow bolt penetrates a top mounting plate hole, a spacer hole and a bottom mounting plate hole. An associated nut is used to secure each of the aforesaid bow bolts. This is typical for all the spacers. Alternative embodiments may utilize pins or other mechanical fastening methods instead of bow bolts without departing from the scope and spirit of the present invention.

The front plate is substantially long, flat, and rectangular and comprises an interior side, an exterior side, a top edge and a bottom edge and two side edges. The front plate connects or abuts the top mounting plate and the bottom mounting plate at the front edge of the mounting plates. The top edge of the front plate touches along its entire length with the entire length of the front edge of the top mounting plate. The bottom edge of the front plate attaches along its entire length with the entire length of the front edge of the bottom mounting plate. The front plate abuts to the top and bottom mounting plates such that the interior side of the front plate faces and is substantially perpendicular to the top and bottom mounting plates. The top and bottom mounting plates are attached such that the interior side of the top mounting plate faces toward the interior side of the bottom mounting plate. Alternative embodiments may forego use of the front plate or not attach it with other components of the present art without departing from the scope and spirit of the present invention.

In a preferred embodiment, the bow base plate is substantially flat and rectangular and comprises a mount side, a pad side and four bow base plate holes. The mount side of the bow base plate attaches substantially parallel to and near the center of the front plate of the bow mounting section with the long axis of the bow base plate substantially parallel to the long axis of the front plate. In a preferred embodiment, the bow base plate holes are located near each corner with each bow base plate hole capable of accepting a ¼ inch bolt. In a preferred embodiment, the bow base plate is welded to the front plate. Alternative embodiments incorporate other means of attachment including but not limited to nuts and bolts, pins, clamps, and other mechanical fasteners.

In a preferred embodiment, the clamping section comprises a top clamp plate, a bottom clamp plate, a clamp bolt, and two clamp posts or guide rods. In a preferred embodiment, the top clamp plate is substantially flat and rectangular and further comprises a top side and a bottom side, two posts, and a top clamp plate hole. The bottom side of the top clamp plate attaches to the exterior side of the top plate near the center of the front edge. In a preferred embodiment, the top clamp plate hole is approximately centered in the plate and is capable of accommodating a ⅝ inch bolt or rod and the two posts are ⅝" rod and are aligned on either side of the top clamp plate hole. In an alternative embodiment, the top clamp plate hole and posts can vary in size, quantity, and location. The two posts are attached by welding to the bottom side of the top clamp plate and are oriented such that the rod axis is perpendicular to the top clamp plate. In an alternative embodiment, the posts can be attached by any mechanical means to the top clamp plate. Alternative embodiments may forego use of the clamp plates, posts, or guide rods or use more or less than specified without departing from the scope and spirit of the present invention.

In a preferred embodiment, the bottom clamp plate is substantially similar in size and shape to the top clamp plate and comprises a top side, a bottom side, a bottom clamp plate hole, two post holes, and two post guides. The bottom side of the bottom clamp plate attaches to the exterior side of the bottom mounting plate with the bottom clamp plate generally aligned with the top clamp plate. The bottom clamp plate hole is centered and aligned between the two post holes and each of these holes is approximately ⅝ inch. The bottom clamp plate hole corresponds to and substantially aligns with the top clamp plate hole. In operation, each of the two posts penetrate the top mounting plate, the bottom mounting plate, the bottom clamping plate and a post guide. The aforesaid clamp bolt preferably penetrates the top clamp plate, the top mounting plate, the bottom mounting plate, and the bottom clamp plate with holes provided therein. An associated nut is used to tighten the clamp bolt.

In a preferred embodiment, the bow shaft section is comprised of a shaft, shaft holes, a removable shaft pin, and a shaft plate. The shaft plate is further comprised of a shaft side, a pad side and four shaft plate holes. In a preferred embodiment, the shaft is cylindrical with multiple circular shaft holes around the circumference near the middle and end of the shaft. Alternative embodiments of the shaft include but are not limited to a solid, toothed, or a gear-shaped shaft. The shaft holes are capable of receiving a removable shaft pin which is any generally long, cylindrical piece used to maintain the shaft in a specific position or prevent it from disengaging with the stand. Preferably, at least one shaft hole is placed near the end of the shaft opposite the shaft plate for rotatably holding the shaft within the stand and one or more holes are placed near the shaft midsection for angular holding of the shaft with the stand.

In a preferred embodiment, the shaft plate is substantially similar in size and shape to the aforesaid bow base plate having a shaft plate hole near each corner with each shaft plate hole capable of accepting a ¼ inch bolt. The shaft plate holes substantially correspond and align with the aforesaid bow base plate holes. Alternate embodiments of the shaft plate include any shape and configuration large enough to accept the shaft and four bolts around the shaft. In a preferred embodiment, the shaft attaches near the center of the shaft side of the shaft plate with the longitudinal axis of the shaft perpendicular to the shaft plate. In a preferred embodiment, the bow shaft is welded to the bow shaft plate. Alternative embodiments include but are not limited to one-piece construction, threaded attachment and other mechanical means. Again, the number or size of the shaft plate holes for both the stern and bow portions may be varied or eliminated altogether without departing from the scope and spirit of the present invention provided that other mechanical fasteners or clamping methods are utilized to perform the equivalent holding and clamping function. Said mechanical fastening means includes but is not limited to clamps, rivets, adhesives, or welds.

In a preferred embodiment, the bow absorber pad is substantially flat and rectangular and more specifically is approximately the same size and shape as the aforesaid shaft plate and generally thicker than the shaft plate. The bow absorber pad allows for a cushioned holding of the personal watercraft by the components of the apparatus thereby minimizing the stresses on the hull. Alternative embodiments may eliminate the bow absorber pad, provided that the watercraft to be held may take the additional stresses. The bow absorber pad has two identical flat sides and has a pad hole near each corner which substantially corresponds in size and location with each aforesaid shaft plate hole and each aforesaid bow base plate hole. The pad holes are capable of accepting four pad bolts and associated nuts.

In a preferred embodiment, the stern mounting plate is comprised of a main plate, a rear plate or channel, and a stern base plate. The main plate is generally long, rectangular, and flat and is comprised of a top side, a bottom side, a rear edge and a front edge. The rear plate or channel is of elongated shape with a U-shaped cross section with one short leg and one long leg of the "U". The foremost edge of the long leg attaches substantially perpendicular to and along the entire length of the rear edge of the main plate. In operation, the short leg of the rear plate acts as a lip to accept the stern rim of the watercraft. In a preferred embodiment, the rear plate is substantially straight along its long axis. In an alternative embodiments, the rear plate or channel can be configured as required or desired to conform to the configuration of the stern of a watercraft.

In a preferred embodiment, the stern base plate is flat and rectangular and substantially the same size and shape as the stern shaft plate and the stern absorber pad. The stern base plate has a mount side, a pad side, and four stern base plate holes. The mount side of the stern base plate attaches substantially parallel to and near the center of the outside face of the long leg of the rear plate. The stern base plate is arranged so that an axis through the long side of the stern base plate is substantially parallel to an axis through the long side of the main plate. The four stern base plate holes are preferably located near each corner of the stern base plate and correspond to the aforesaid four pad holes and the aforesaid four shaft plate holes. In a preferred embodiment, the stern base plate is attached to the rear plate by welding. Alternative embodiments incorporate means of attachment including but not limited to nuts and bolts and other mechanical fasteners.

In a preferred embodiment, the bow stand can be any structurally sufficient stand which comprises a horizontal sleeve capable of accepting and securing the shaft of the bow shaft section. The sleeve must be sized such that the shaft can freely rotate within the sleeve. The sleeve must be located at a height above the base of the stand sufficient to allow free rotation of a watercraft once it is mounted onto the stand. In a preferred embodiment, the stand is supported by three pivoting wheels. Alternate embodiments include a stand with any number of wheels and configuration such that a bow shaft section and a stern shaft section can be attached to the stand and more particularly that a watercraft can be easily mounted, rotated and maneuvered on two of the stands. A typical engine stand usually meets the criteria necessary for a bow stand.

In a preferred embodiment, the stern shaft section is identical to the aforesaid bow shaft section and the stern absorber pad is substantially identical to the aforesaid bow absorber pad. In another preferred embodiment, the stern stand is substantially identical to the bow stand.

In a preferred embodiment, the system for mounting, storing, and rotating a personal watercraft comprises the following steps. The first step is to attach the bow mounting section to the bow of the watercraft by positioning the rim of the watercraft at the bow between the top mounting plate and the bottom mounting plate of the bow mounting section. Thereafter substantially all of the bow bolts and the clamp bolt art tightened to securely clamp and attach the bow mounting section to the watercraft. The second step is to attach the bow absorber pad and bow shaft section to the bow mounting plate. This is accomplished by positioning the bow absorber pad between the pad side of the bow base plate and the pad side of the shaft plate and finally attaching the bow base plate, the bow absorber pad and the shaft plate by inserting the four pad bolts through the shaft plate holes, the pad holes and the bow base plate holes and tightening the associated nuts. The third step is to attach the stern mounting plate to the stern of the watercraft by positioning the top side of the stern mounting plate against the hull of the watercraft with the rim of the watercraft fitting into the U-shaped portion of the rear plate of said stern mounting plate. The fourth step is to attach the stern absorber pad and stern shaft section to the stern mounting plate. This is accomplished by positioning the stern absorber pad between the pad side of the stern base plate and the pad side of the shaft plate and finally by attaching the stern base plate, the stern absorber pad, and the shaft plate by inserting four pad bolts through the shaft plate holes, the pad holes, and the stern base plate holes and tightening the associated nuts.

The final step involves mounting the watercraft onto the bow stand and the stern stand. This is accomplished by mounting the bow of the watercraft onto the bow stand by inserting the shaft of the bow shaft section into the sleeve of the bow stand and next by mounting the stern of the watercraft onto the stern stand by inserting the shaft of the stern shaft section into the sleeve of the stern stand. Generally this final step requires the use of a hoist or jacking system. Once mounted, the watercraft can be secured to the bow and stern stands by inserting the removable shaft pins into the shafts of the stern shaft section and the bow shaft section. To rotate the watercraft, the removable shaft pins are removed, the watercraft is rotated to the desired position, and the removable shaft pins are then re-inserted to secure the watercraft in position. In a preferred embodiment, the watercraft is rotated by one or two persons. Alternative embodiments include but are not limited to rotating the watercraft using electrical power or internal combustion engine power. Once rotated, the user may then safely access the hull of the watercraft.

The apparatus and all of its parts may be manufactured from a variety of materials including but not limited to plastics, metals, woods, composites, various rubber materials, leathers, or any other material capable of withstanding the forces placed thereupon. In a preferred embodiment, all of the components of the apparatus with the exception of the absorber pads are composed of steel. In a preferred embodiment, the bow absorber pad and the stern absorber pad are composed of rubber. Alternative embodiments of the material of the absorber pads include but are not limited to plastic, wood, or any other similar flexible material.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
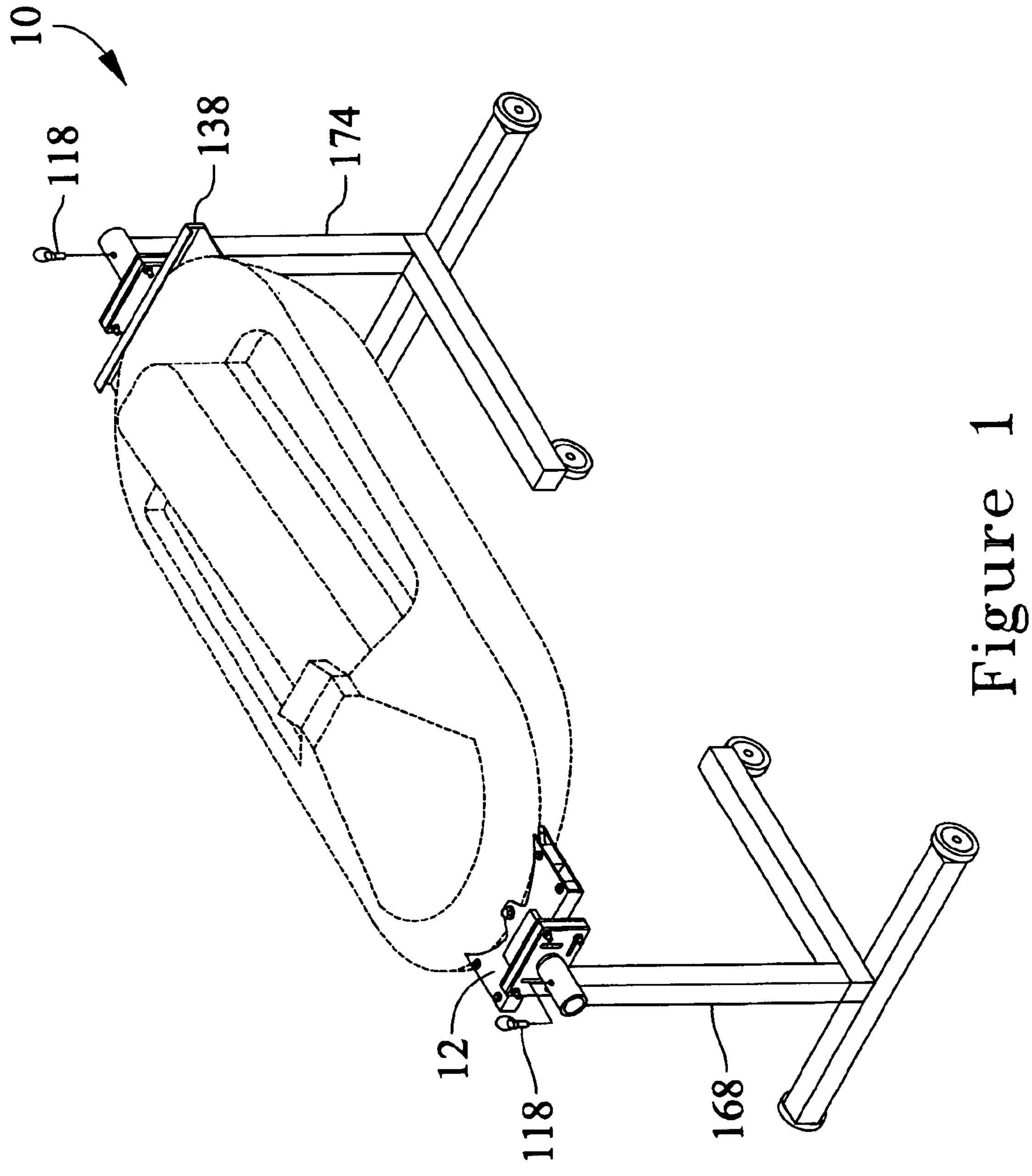
FIG. 1 is a perspective view of an apparatus for mounting, rotating, and holding a personal watercraft showing a watercraft mounted thereupon.
Figure 2:
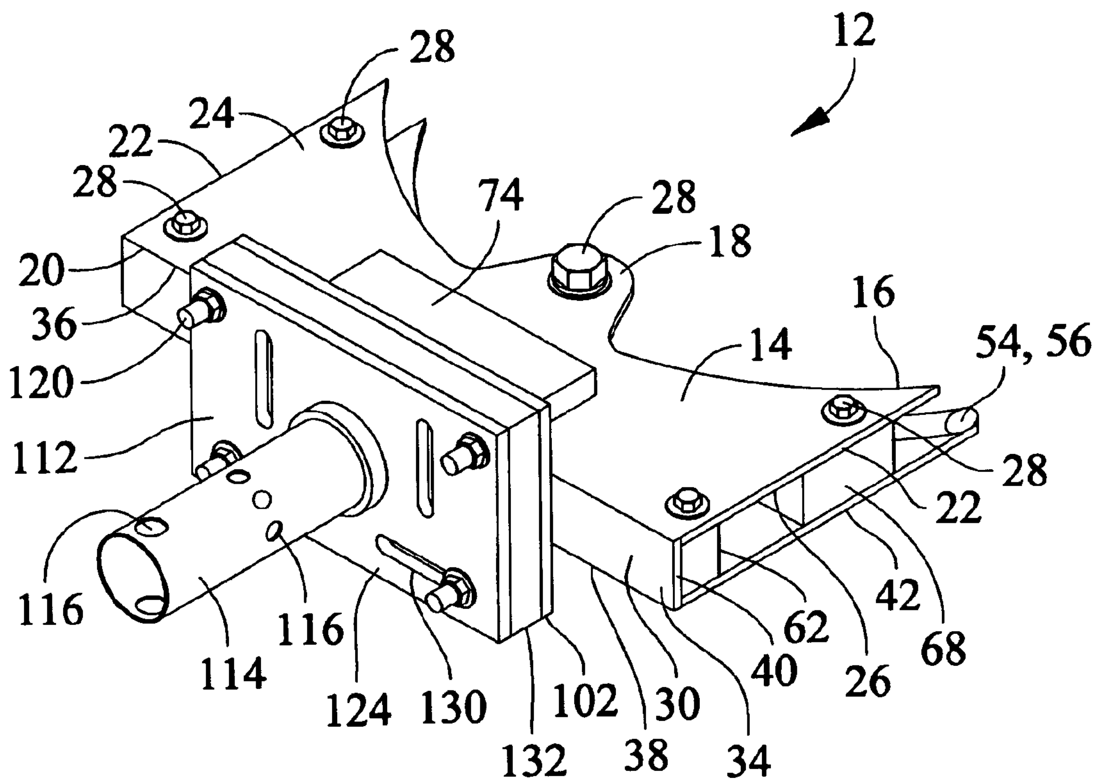
FIG. 2 is a top perspective view of the bow mounting section and bow shaft section of the aforesaid apparatus.
Figure 3:
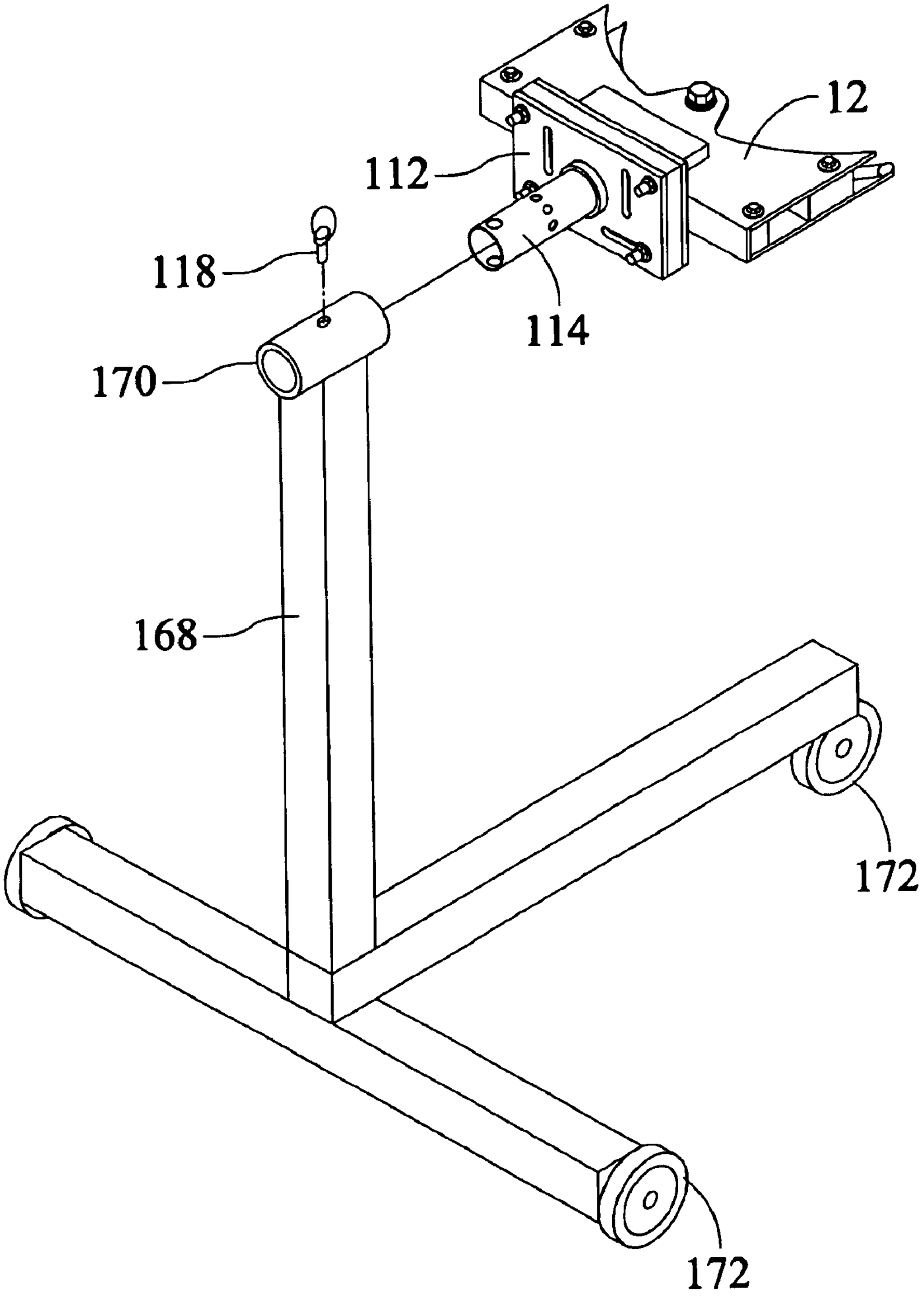
FIG. 3 is a top perspective assembly view of the bow mounting section, bow shaft section, and bow stand of the aforesaid apparatus.
Figure 4:
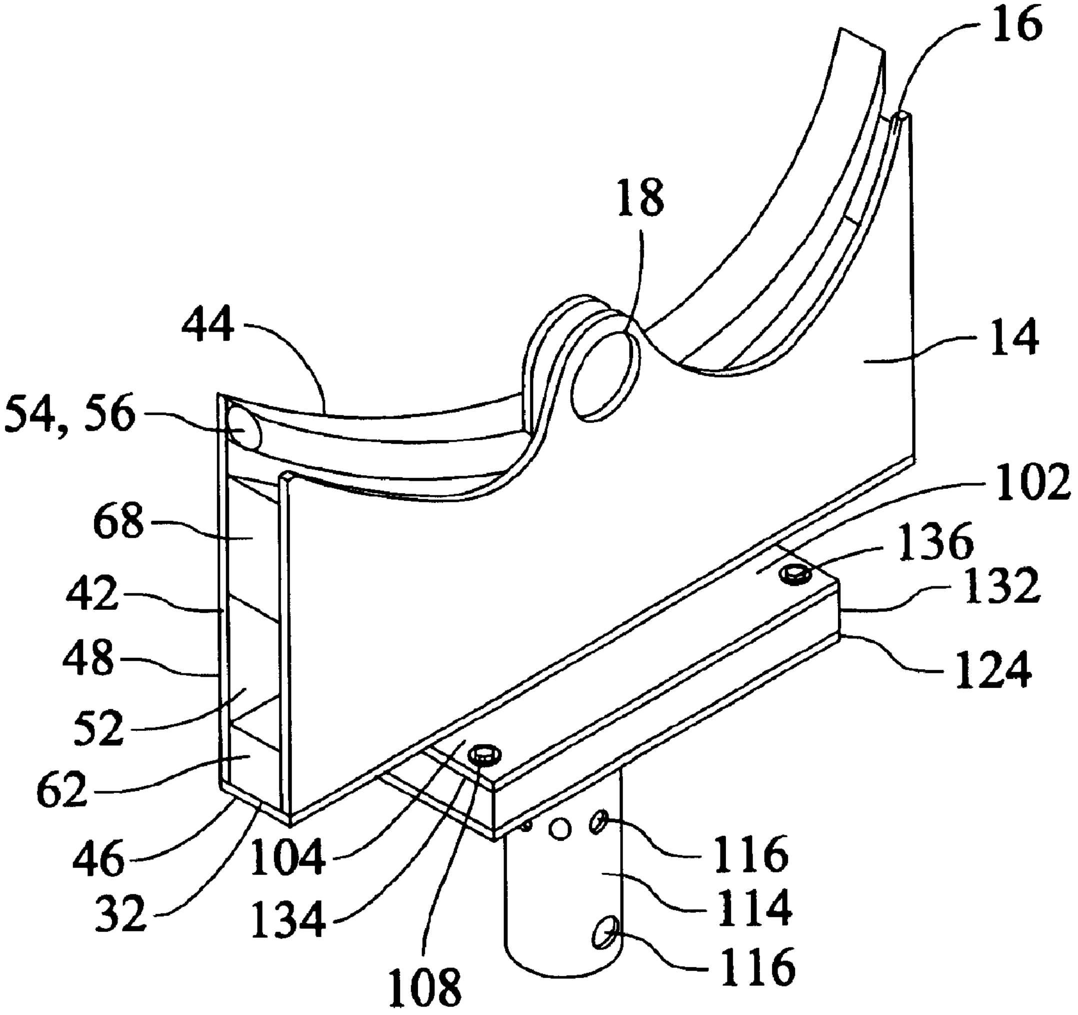
FIG. 4 is a bottom perspective view of the bow mounting section and bow shaft section of the aforesaid apparatus.
Figure 5:
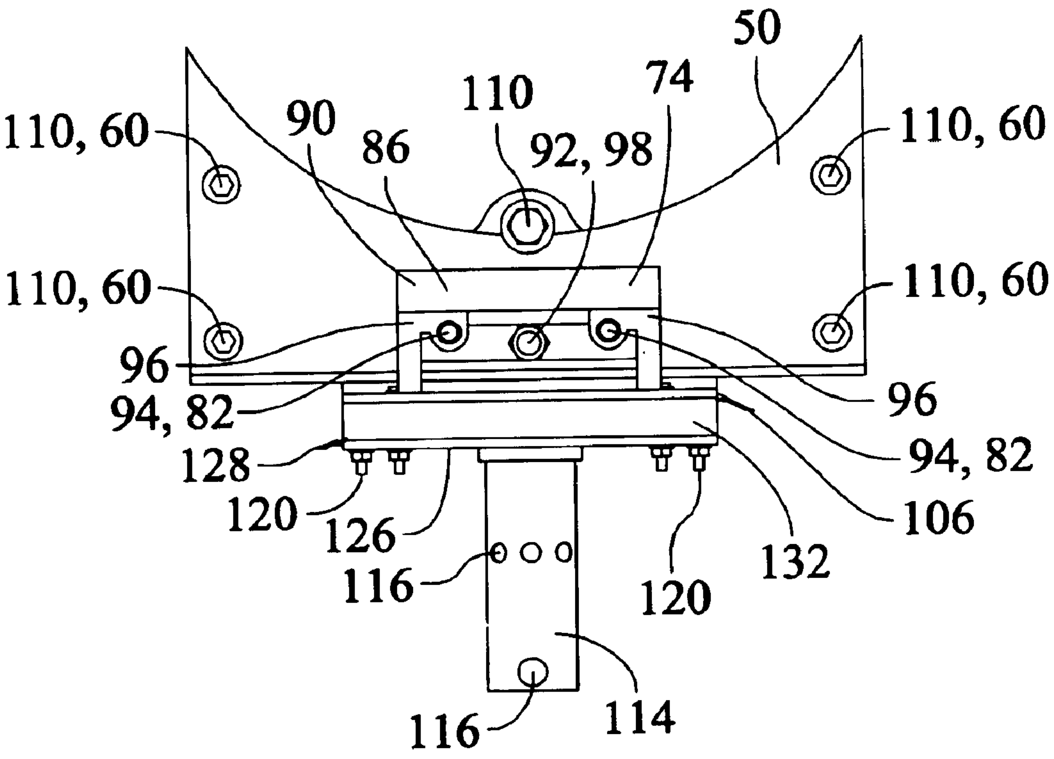
FIG. 5 is a bottom plan view of the bow mounting section and bow shaft section of the aforesaid apparatus.
Figure 6:
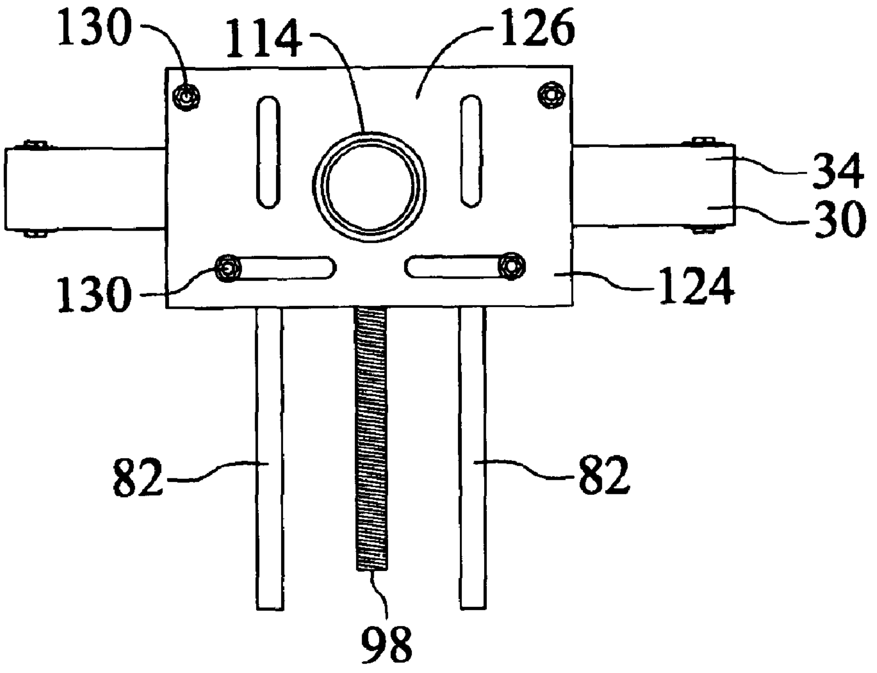
FIG. 6 is a rear plan view of the bow mounting section, bow clamping section, and bow shaft section of the apparatus.
Figure 7:
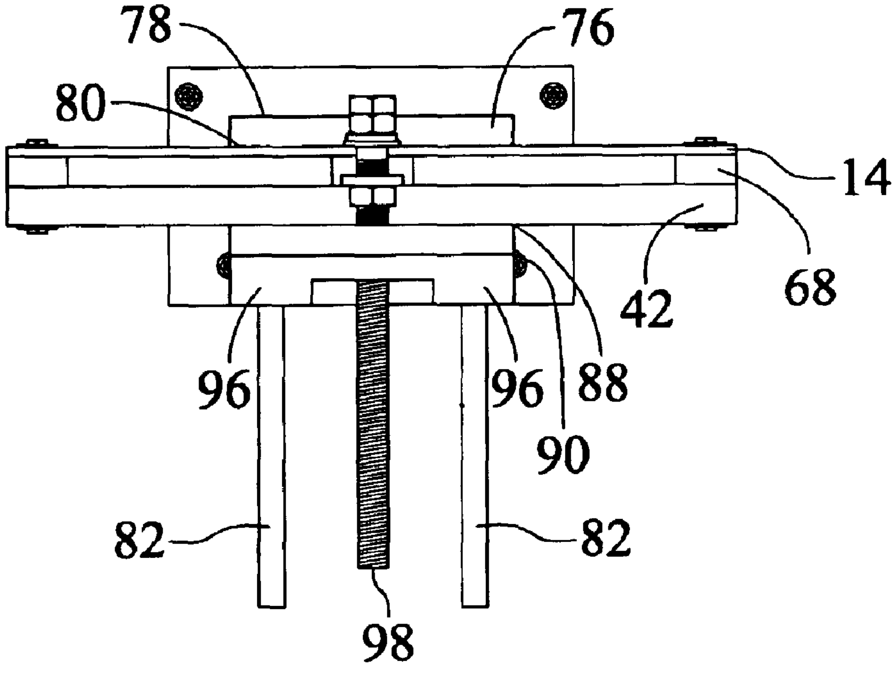
FIG. 7 is a front plan view of the bow mounting section, bow clamping section, and bow shaft section of the apparatus.
Figure 8:
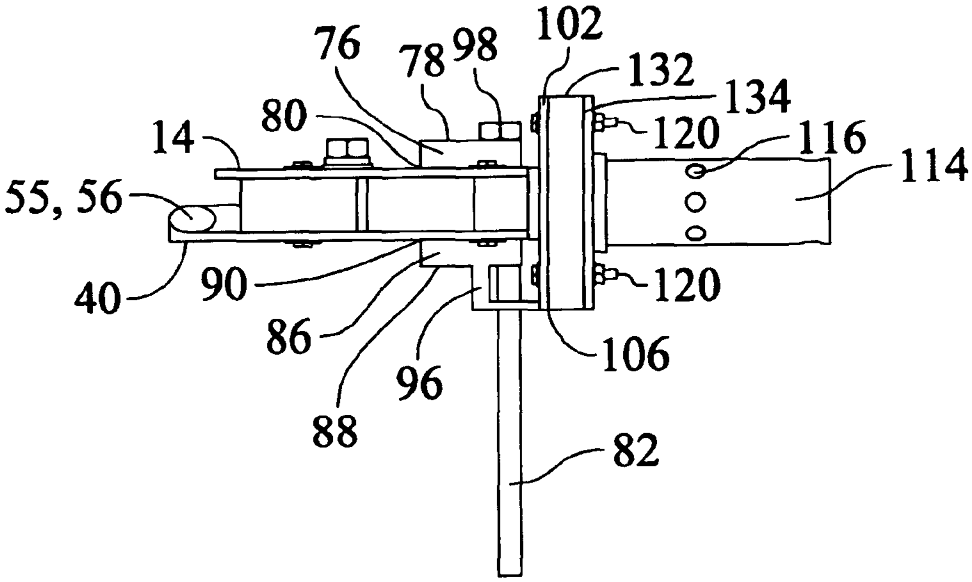
FIG. 8 is a left side plan view of the bow mounting section, bow clamping section, and bow shaft section of the apparatus which is substantially symmetric with a right side plan view.
Figure 9:
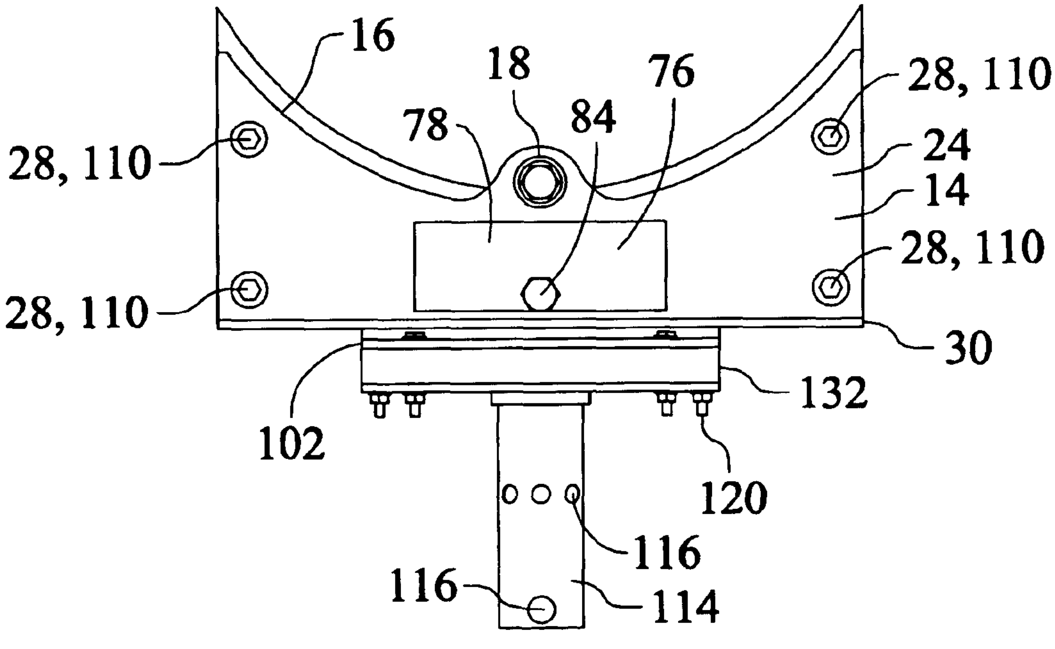
FIG. 9 is a top plan view of the bow mounting section, bow clamping section, and bow shaft section of the apparatus.
Figure 10:
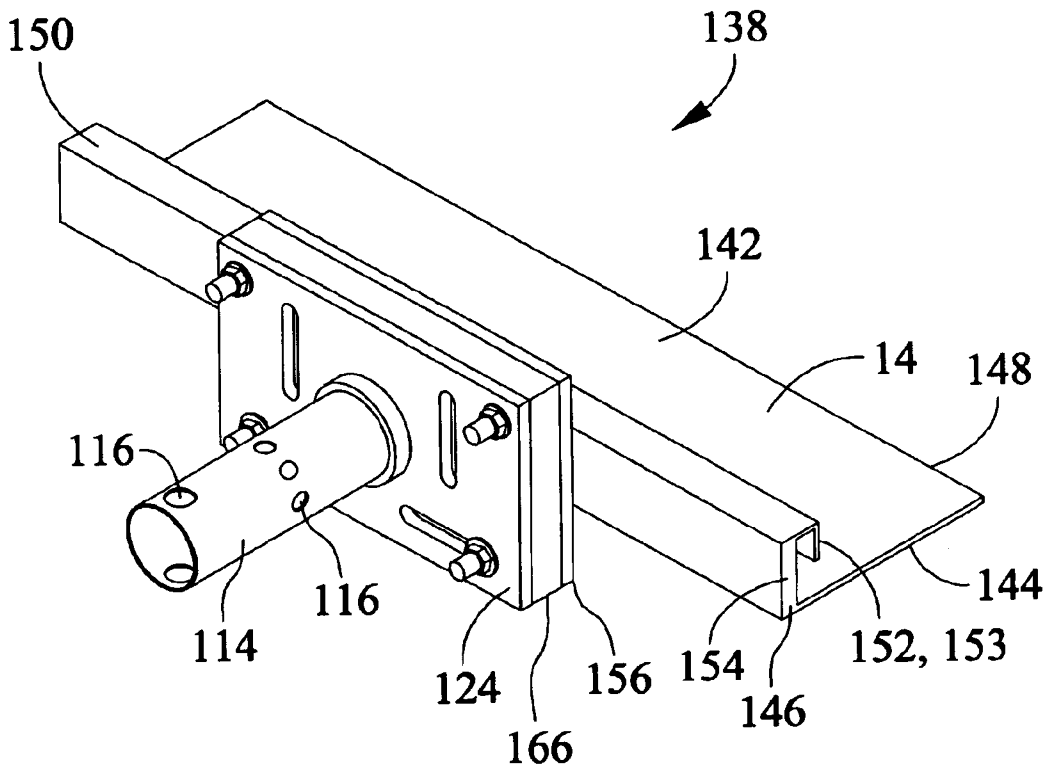
FIG. 10 is a rear perspective view of the stern mounting plate and stern shaft section of the apparatus.
Figure 11:
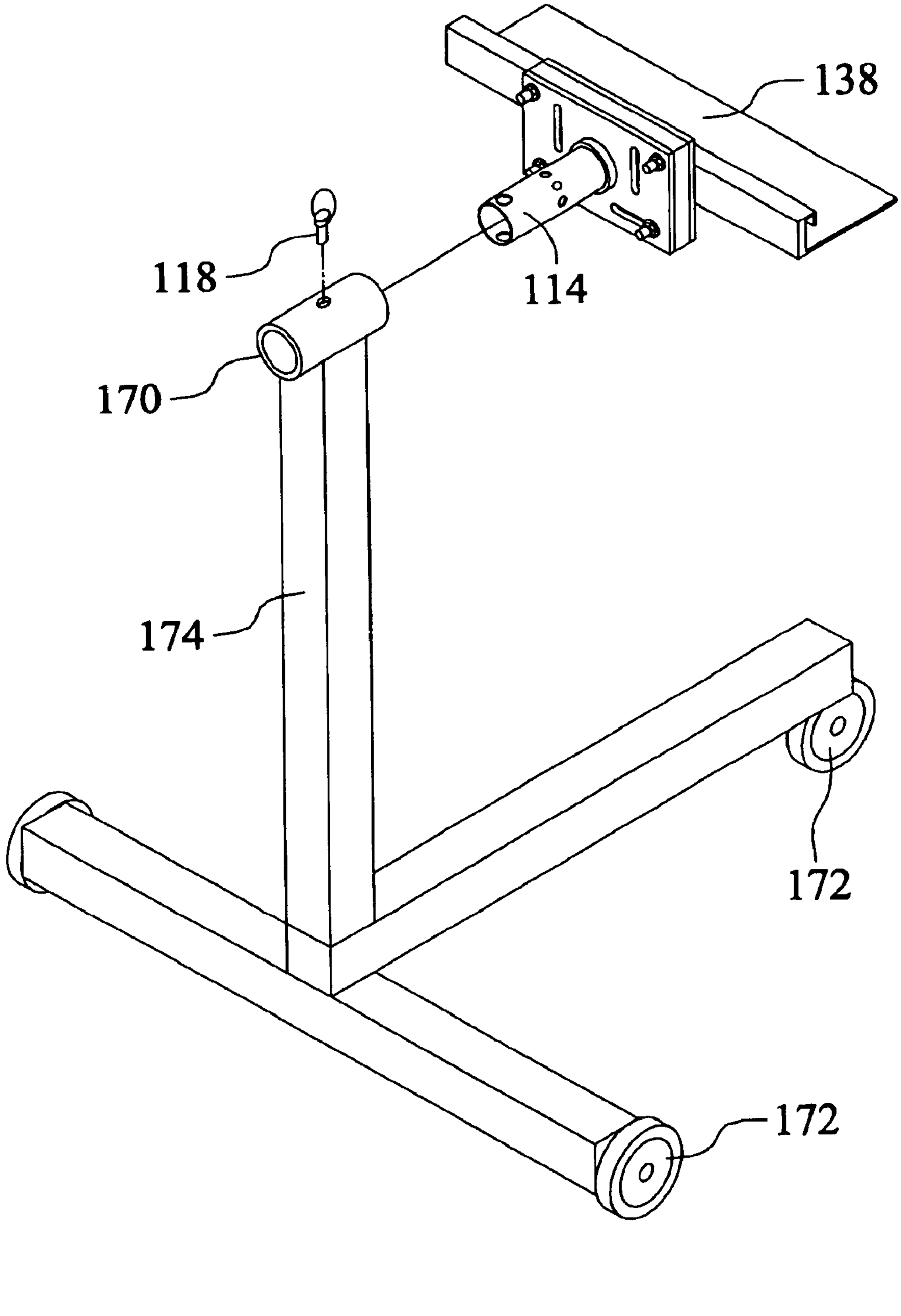
FIG. 11 is a top rear perspective assembly view of the stern mounting plate, stern shaft section, and stern stand of the apparatus.
Figure 12:
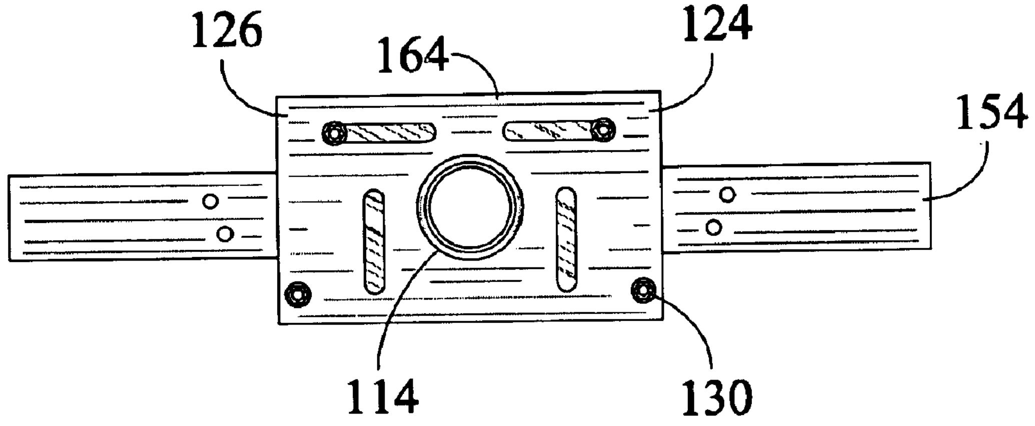
FIG. 12 is a rear plan view of the stern mounting plate and stern shaft section of the apparatus.
Figure 13:
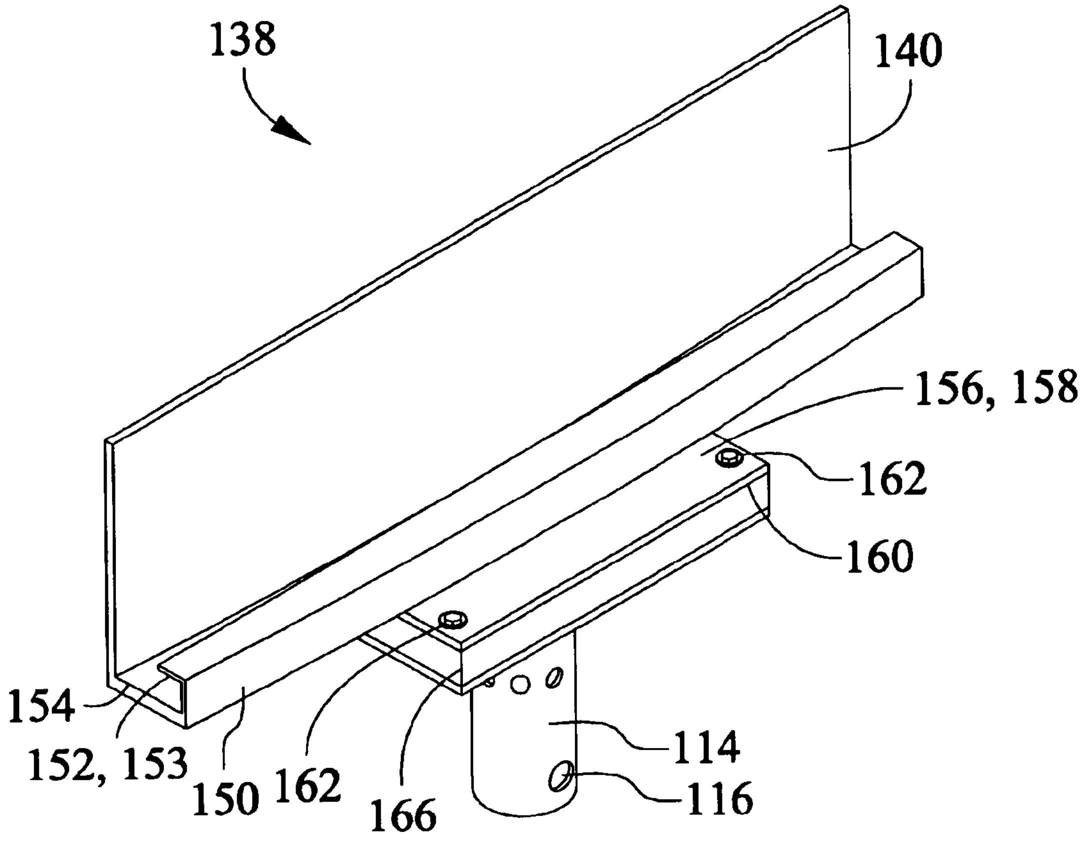
FIG. 13 is a top perspective view of the stern mounting plate and stern shaft section of the apparatus.
Figure 14:
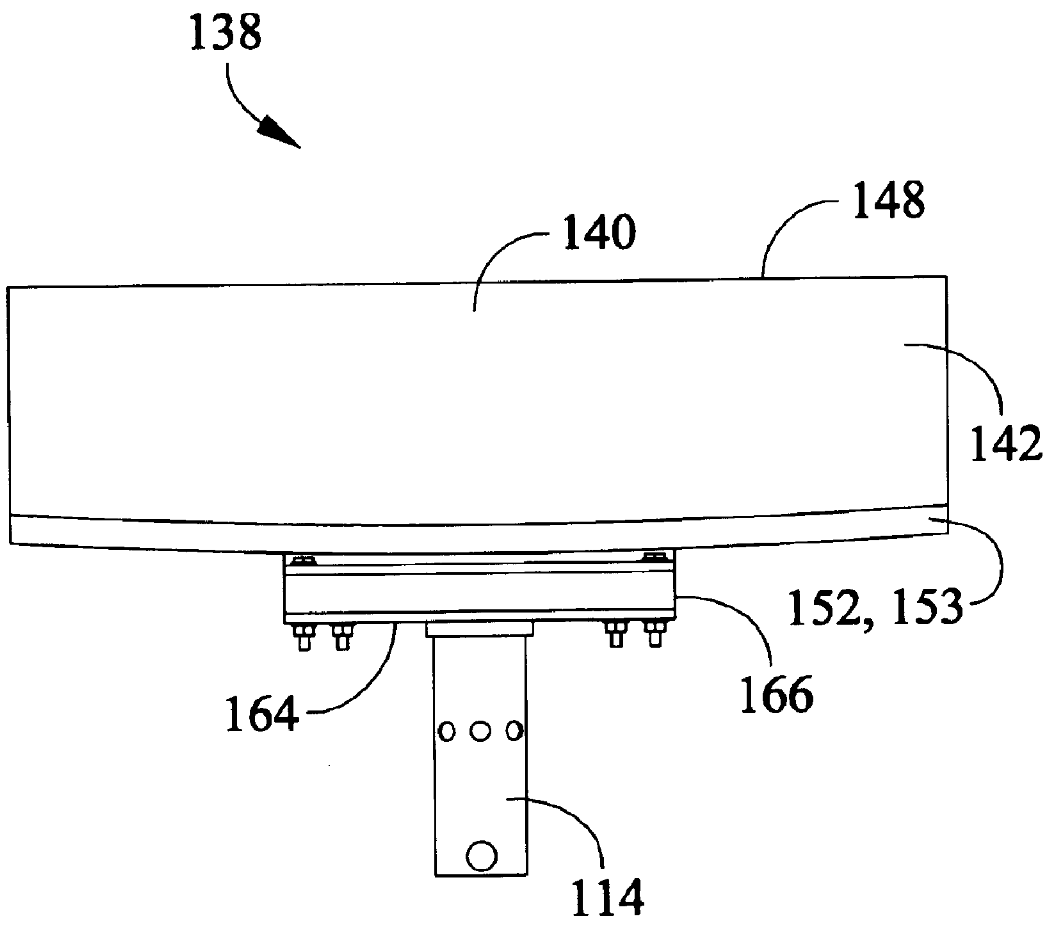
FIG. 14 is atop plan view of the stern mounting plate and stern shaft section of the apparatus.
Figure 15:
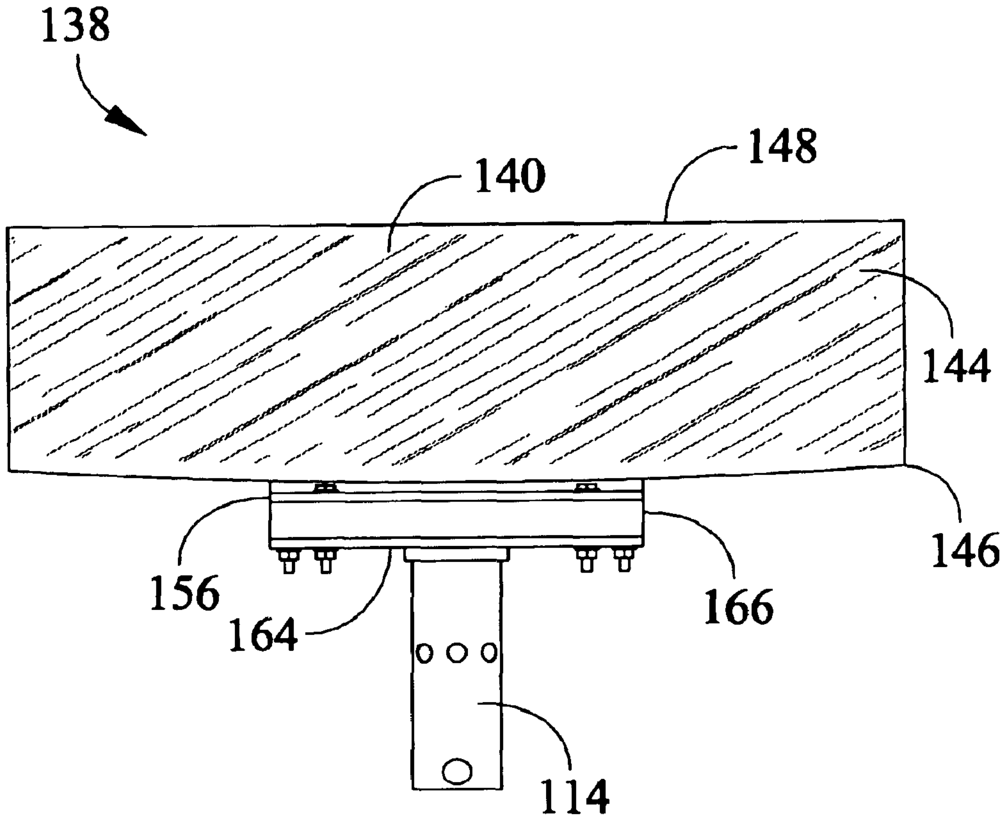
FIG. 15 is a bottom plan view of the stern mounting plate and stern shaft section of the apparatus.
Figure 16:
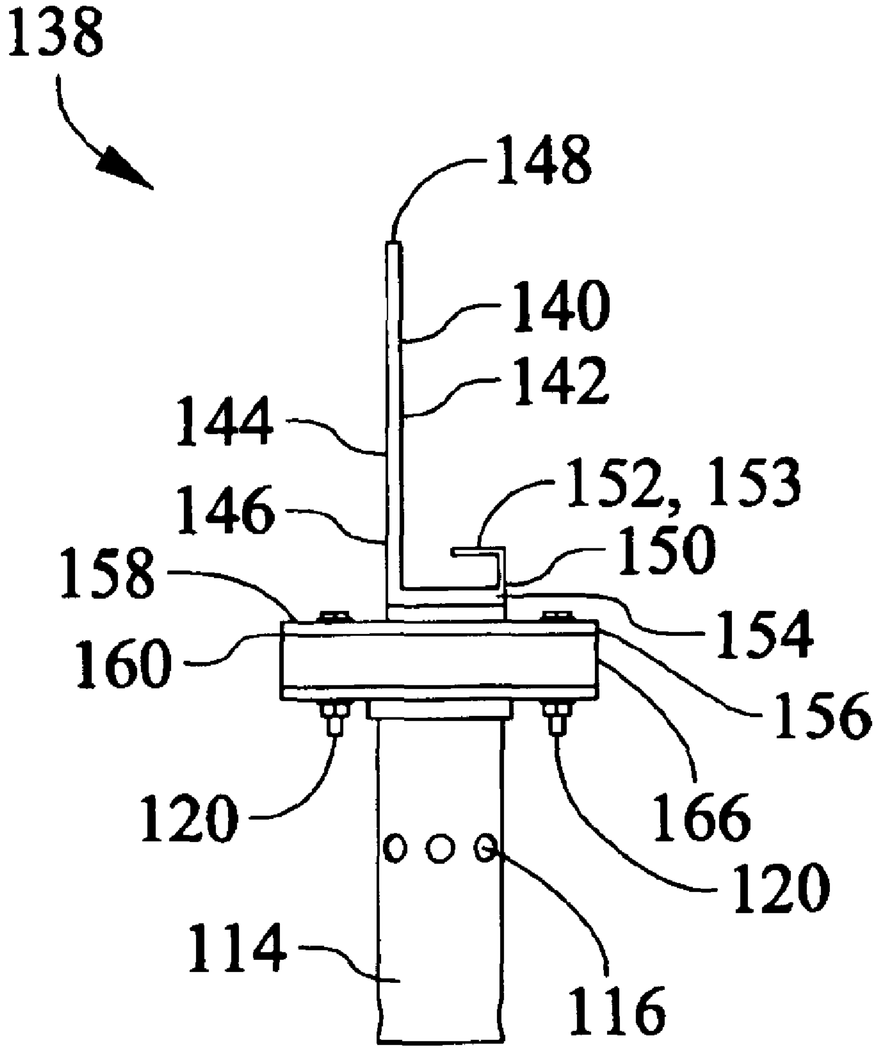
FIG. 16 is a left plan view of the stern mounting plate and stern shaft section of the apparatus which is substantially symmetric with a right plan view.
Figure 17:
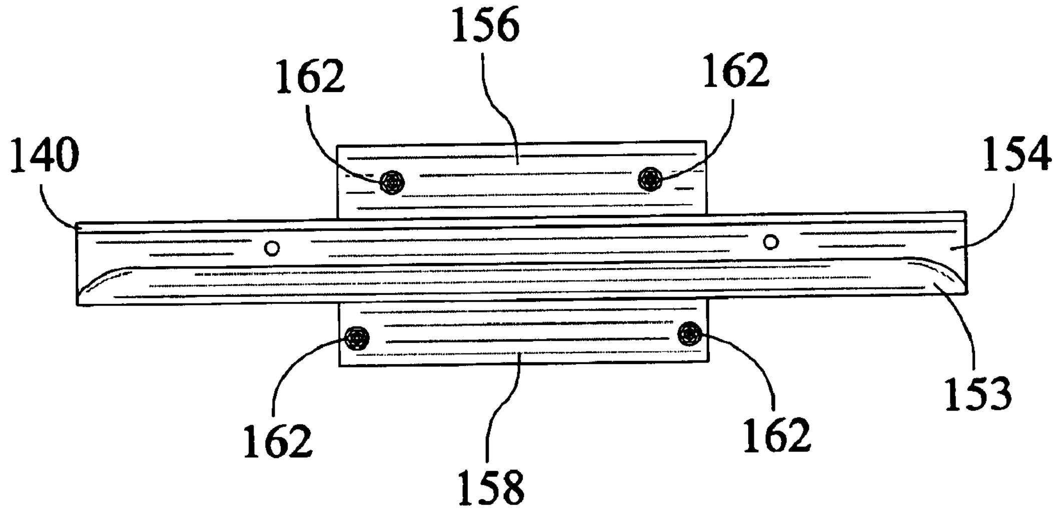
FIG. 17 is a front plan view of the stern mounting plate and stern shaft section of the apparatus.
Figure 18:
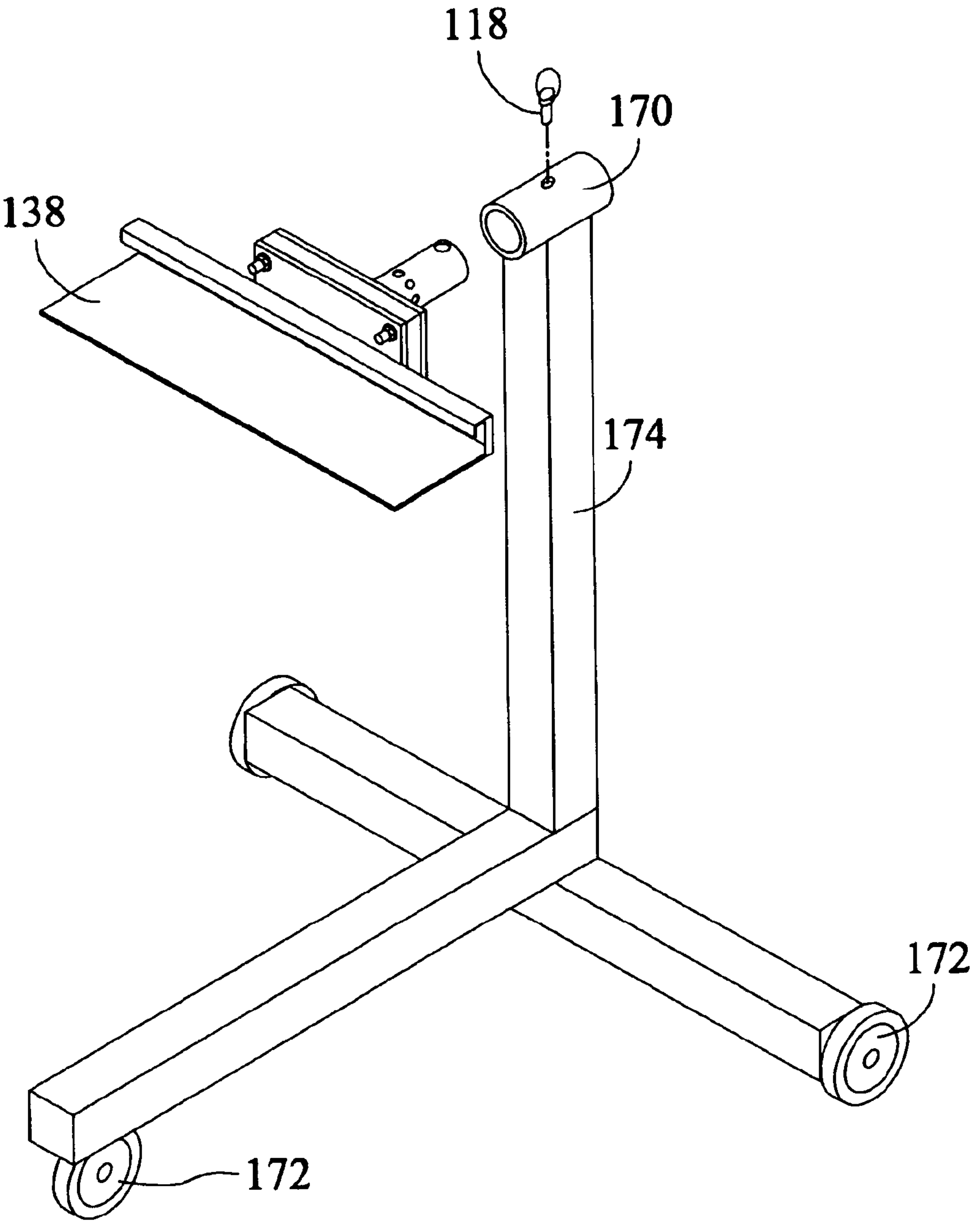
FIG. 18 is a top front perspective assembly view of the stern mounting plate, stern shaft section, and stern stand of the apparatus.

Referring now to the drawings, there is shown in FIGS. 1–18 an apparatus for mounting, rotating, and holding a personal watercraft and associated components. The apparatus for mounting, rotating, and holding a personal watercraft 10 is particularly adapted for easy and convenient repair and maintenance of personal watercraft. The apparatus 10 provides a system for watercraft mounting, rotating, and holding during repair and maintenance thereby allowing for a method of use to be claimed and defined herein.

The drawings show the apparatus comprising, in a preferred embodiment, a bow mounting section 12, a bow shaft section 112, a bow absorber pad 132, a stern mounting plate 138, a stern shaft section 164, a stern absorber pad 166, a bow stand 168, and a stern stand 174. The bow mounting section 12 and the bow shaft section 112 are conjoined with the bow absorbing pad 132 sandwiched therebetween. The bow shaft section 112 rotatably mounts with the bow stand 168. The stern section similarly interconnects with the aforesaid stern section components. That is, the stern mounting plate 138 and the stern shaft section 164 are conjoined with the stern absorbing pad 166 sandwiched therebetween. Also, the stern shaft section 164 rotatably mounts with the stern stand 174. Preferably, the stern stand 174 rotational axis is of substantially equivalent height to the bow stand 168 rotational axis with both stands having pivoting wheels or castors 172 at the base to provide translational movement.

In a preferred embodiment, the bow mounting section 12 is comprised of a top mounting or clamping plate 14, a front plate 30, a bottom mounting plate 42, two deep spacers 62, three shallow spacers 68, a clamping section 74, a bow base plate 102, and five bow bolts and nuts 110. The top mounting plate 14 is generally rectangular and substantially flat with unique edge variations. Said plate 14 comprises a bow edge 16, a front edge 20, two side edges 22, an exterior side 24, an interior side 26, and six top mounting plate holes 28. In a preferred embodiment, the bow edge 16 is generally U-shaped to correspond to the shape of at least a portion of the bow of a personal watercraft, with the bottom or base of the "U" oriented towards or closest to the opposite front edge 20. Alternative embodiments include any configuration of the bow edge 16 which is required or useful to fit the bow of a personal watercraft. In another alternative embodiment, the bow edge 16 can have an attached section 18 located in or near the center and having an integral hole. Said integral hole corresponds to a hole in the center of the bow rim of some watercraft and can facilitate attaching the bow mounting section 12 to those watercraft by inserting a bolt, pin, tube, or other fastener through the holes in each. Said fastener could also be integrally attached with said integral hole in an alternative embodiment. In operation, the five bow bolts 110 are inserted into the top mounting plate holes 28 and are used to facilitate the clamping of the bow rim of a watercraft.

In a preferred embodiment, the bottom mounting plate 42 is substantially identical to the top mounting plate 14 except that the dimension from the front edge 46 to the bow edge 44 is slightly longer than the equivalent dimensions of the top mounting plate 14 or clamp. In its preferred form, the bottom mounting plate 42 comprises a bow edge 44, a front edge 46, two side edges 48, an exterior side 50, an interior side 52, a bow lip 54, and eight bottom mounting plate holes 60. The bow edge 44 of the bottom mounting plate 42 is shaped substantially identical to the bow edge 16 of the top mounting plate 14. In a preferred embodiment, a bow lip 54 attaches to the interior side 52 along the entire bow edge 44 of the bottom mounting plate 42 and comprises a smooth metallic rod 56 which seats with and facilitates clamping of the rim of the watercraft bow. Alternative embodiments of the bow lip 54 include any type, shape, and length of materials which can facilitate the clamping of the bow rim of the watercraft.

In a preferred embodiment, the two deep 62 and three shallow 68 spacers are comprised of a generally cube-shaped piece each having a spacer hole and functioning as spacers between the top mounting plate 14 and the bottom mounting plate 42, with the spacers preferably attached to the bottom mounting plate 42. In an alternative embodiment, the spacers 62, 68 can be of any shape, quantity, and form and attach or float relative to either the top 14 or the bottom 42 mounting plate. The aforesaid shallow spacers 68 are positioned between the top 14 and bottom 42 mounting plates near the bow edge 16, 44 of the mounting plates 14, 42 and the deep spacers 62 are positioned between the top 14 and bottom 42 mounting plates near the front edge 20,46 of the mounting plates 14, 42. In a preferred embodiment, in a non-clamping condition, the deep spacers 62 contact both the top mounting plate 14 and the bottom mounting plate 42 and an approximate distance or gap of ¼" exists between the shallow spacers 68 and the top mounting plate 14. In an alternative embodiment, the spacers 62, 68 can be dimensioned as required to allow secure and non-damaging clamping of the bow rim of a personal watercraft. The spacer hole in each of the shallow 68 and deep 62 spacers is capable of penetration by an aforesaid bow bolt 110. The spacers 62,68 are positioned such that a bow bolt 110 penetrates a top mounting plate hole 28, a spacer hole and a bottom mounting plate hole 60, thereby securing the component parts together. An associated nut is used to secure each of the aforesaid bow bolts 110. This is typical for all the spacers 62, 68.

The front plate 30 is substantially long, flat and rectangular and comprises an interior side 32, an exterior side 34, a top edge 36 and a bottom edge 38 and two side edges 40. The front plate 30 connects the top mounting plate 14 and the bottom mounting plate 42 at the front edge 20,46 of the mounting plates 14, 42. In its preferred form, when the apparatus is assembled, the top edge 36 of the front plate 30 mates or is placed near and along its entire length with the entire length of the front edge 20 of the top mounting plate 14. The bottom edge 38 of the front plate 30 attaches, preferably via welding, along its entire length near or with the entire length of the front edge 46 of the bottom mounting plate 42. The front plate 30 is placed with the top 14 and bottom 42 mounting plates such that the interior side 32 of the front plate 30 faces and is substantially perpendicular to the top 14 and bottom 42 mounting plates. The top 14 and bottom 42 mounting plates are mounted, assembled, or attached such that the interior side 26 of the top mounting plate 14 faces the interior side 52 of the bottom mounting plate 42. That is the normal relative to the plane of each interior side 26, 52 point in substantially opposite directions so that each interior side 26, 52 faces the other.

In a preferred embodiment, the bow base plate 102 is substantially flat and rectangular and comprises a mount side 104, a pad side 106 and four bow base plate holes 108. The mount side of the bow base plate 102 attaches substantially parallel with and near the center of the front plate 30 of the bow mounting section 12 with the long axis of the bow base plate 102 substantially parallel to the long axis of the front plate 30. In a preferred embodiment, the bow base plate 102 holes 108 are located near each corner with each bow base plate hole 108 capable of accepting a ¼ inch bolt. In a preferred embodiment, the bow base plate 102 is welded to the front plate 30. Alternative embodiments incorporate other means of attachment including but not limited to nuts and bolts and other mechanical fasteners.

In a preferred embodiment, the clamping section 74 comprises a top clamp plate 76, a bottom clamp plate 86, a clamp bolt 98, and two clamp posts 82. In a preferred embodiment, the top clamp plate 76 is substantially flat and rectangular and further comprises a top side 78 and a bottom side 80, two posts or guide rods 82, and a top clamp plate hole 84. The bottom side 80 of the top clamp plate 76 attaches to or mates with the exterior side 24 of the top plate 14 near the center of the front edge 20. In a preferred embodiment, the top clamp plate hole 84 is approximately centered in the plate and is capable of accommodating a ⅝" bolt or rod and the two posts or guide rods 82 are ⅝ inch rod and are aligned on either side of the top clamp plate hole 84. In an alternative embodiment, the top clamp plate hole 84 and posts 82 can vary in size, quantity and location. The two posts 82 are preferably attached by welding to the bottom side 80 of the top clamp plate 76 and are oriented such that the rod axis is substantially perpendicular to the top clamp plate 76. In an alternative embodiment, the posts 82 can be attached by any mechanical means to the top clamp plate 76.

In a preferred embodiment, the bottom clamp plate 86 is substantially similar in size and shape to the top clamp plate 76 and comprises a top side 88, a bottom side 90, a bottom clamp plate hole 92, two post holes 94, and two post guides 96. The bottom side 90 of the bottom clamp plate 86 attaches to or mates with the exterior side 50 of the bottom mounting plate 42 with the bottom clamp plate 86 generally aligned with the top clamp plate 76. In the preferred form, the bottom clamp plate hole 92 is substantially centered and aligned between the two post holes 94 and each of these holes is approximately ⅝ inch. The bottom clamp plate hole 92 corresponds to the top clamp plate hole 84. In operation, each of the two posts 82 penetrate through the top mounting plate 14, the bottom mounting plate 42, the bottom clamping plate 86 and a post guide 96 via holes provided in each of the aforesaid. The aforesaid clamp bolt 98 penetrates through the top clamp plate 76, the top mounting plate 14, the bottom mounting plate 42 and the bottom clamp plate 86 via holes provided in each of the aforesaid. An associated nut is used to tighten the clamp bolt 98 thereby drawing the top mounting plate 14 toward the bottom mounting plate 42. Alternative embodiments may forego use of the aforesaid guide posts 82 or rods and the aforesaid clamp plates 76, 86 without departing from the scope and spirit of the present invention. Further alternative embodiments of the clamping section 74 may forego use of the aforesaid components including the clamp bolt 98 and utilize other clamping means to apply a positive force to the plates 14, 42. These include but are not limited to C-clamps, spring loaded clamps, VISEGRIPS, or magnetic attraction.

In a preferred embodiment, the bow shaft section 112 is comprised of a shaft 114, one or more shaft holes 116, a removable shaft pin 118, and a shaft plate 124. The shaft plate 124 further comprises a shaft side 126, a pad side 128 and four shaft plate holes 130 or slots. In a preferred embodiment, the shaft 114 is a cylindrical pipe or member with one or more circular shaft holes 116 around the circumference near the middle of the shaft 114 for angular or rotational securing and one 9or more shaft holes 116 near the shaft 114 end for translationally securing the shaft with the stand 168, 174. Alternative embodiments of the shaft 114 include but are not limited to a solid shaft, toothed, non-circular cross section, or a gear-shaped shaft. The shaft holes 116 are capable of receiving a removable shaft pin 118 which is any generally long, cylindrical piece used to maintain the shaft 114 in a specific position. In a preferred embodiment, the shaftplate 124 is substantially similar in size and shape to the aforesaid bow base plate 102 having a shaft plate hole 130 near each corner with each shaft plate hole 130 capable of accepting a ¼ inch bolt. The shaft plate holes 130 substantially correspond to the aforesaid bow base plate holes 108 when mated with such. Alternate embodiments of the shaft plate 124 include any shape and configuration large enough to accept the shaft 114 and one or more bolts around the shaft 114. In a preferred embodiment, the shaft 114 attaches near the center of the shaft side 126 of the shaft plate 124 with the longitudinal axis of the shaft 114 substantially perpendicular to the shaft plate. In a preferred embodiment, the bow shaft 114 is welded to the bow shaft plate 124. Alternative embodiments include but are not limited to one-piece construction, threaded attachment, and other mechanical attachment means for said shaft 114.

In a preferred embodiment, the bow absorber pad 132 is substantially flat and rectangular and more specifically is approximately the same size and shape as the aforesaid shaft plate 124 and generally thicker than the shaft plate 124. The bow absorber pad 132 preferably has substantially two identical flat sides 134 and has a pad hole 136 near each corner which corresponds in size and location to each aforesaid shaft plate hole 130 and each aforesaid bow base plate hole 108. The pad holes 136 are capable of accepting four pad bolts 120 and associated nuts which transition through the bow base plate 102 and the shaft plate 124 thereby holding the aforesaid together as a sandwich. Alternative embodiments may forego use of the absorber pads 132, 166 without departing from the scope and spirit of the present invention.

In a preferred embodiment, the stern mounting plate 138 is comprised of a main plate 140, a rear plate or channel 150, and a stern base plate 156. The main plate 140 is generally rectangular and flat and is comprised of a top side 142, a bottom side 144, a rear edge 146 and a front edge 148. The rear plate or channel 150 is substantially longer than its cross sectional width and has a substantially U-shaped cross section with one short leg 152 and one long leg 154. The edge or end of the long leg 154 attaches substantially perpendicular to and along substantially the entire length of the rear edge 146 of the main plate 140. In operation, the short leg 152 of the rear plate 150 or channel acts as a lip 153 to accept the stern rim of the watercraft. Typically, said stern rim has a gap within which said short leg 152 fits. In a preferred embodiment, the rear plate 150 is substantially straight along its lengthwise axis. In an alternative embodiment, the rear plate 150 can be configured as required to conform to the configuration of the stern of a watercraft.

In a preferred embodiment, the stern base plate 156 is flat and rectangular and substantially the same size and shape as the stern shaft plate 124 and the stern absorber pad 166. The stern base plate 156 has a mount side 158, a pad side 160, and four stern base plate holes 162. The mount side 158 of the stern base plate 156 attaches substantially parallel to and near the center of the outside face of the long leg 154 of the rear plate 150. The stern base plate 156 is arranged so that an axis through the long side of the stern base plate is substantially parallel to an axis through the long side of the main plate 140. The four stern base plate holes 162 are preferably located near each corner of the stern base plate 156 and correspond to the four pad holes 136 and the four shaft plate holes 130. In preferred embodiment, the stern base plate 156 is attached to the rear plate 150 by welding. Alternative embodiments incorporate means of attachment including but not limited to nuts and bolts, rivets, and other mechanical fasteners. In a preferred embodiment, the stern shaft section 164 is substantially identical to the aforesaid bow shaft section 112 and the stern absorber pad 166 is substantially identical to the aforesaid bow absorber pad 132 with the description, assembly, and numbering remaining the same.

In a preferred embodiment, the bow stand 168 or the stern stand 174 can be any structurally sufficient stand which has an attached horizontal sleeve 170 or hub capable of accepting and securing the shaft 114 of the bow shaft section 112 or the shaft 114 of the stern shaft section 164. The sleeve 170 must be sized such that the shaft 114 can freely rotate within the sleeve 170. The sleeve 170 must be located at a height above the base of the stand 168, 174 or floor level sufficient to allow free rotation of a watercraft once it is mounted onto the stand 168, 174. Preferably the sleeve 170 has one or more holes within which may be mated with the shaft holes 116 for securing with the shaft pin 118. Alternative embodiments may utilize other methods of or means for holding said shafts 114, including but not limited to notches, mechanical clamps, indentations, chucks, collets, or other types of hubs without departing from the scope and spirit of the present invention.

In a preferred embodiment, the stand 168, 174 is supported by three pivoting wheels 172. Alternate embodiments include a stand 168, 174 with or without any number of wheels and configuration such that a bow shaft section 112 and a stern shaft section 164 can be attached to the stand 168, 174 and more particularly that a watercraft can be easily mounted, rotated and maneuvered on two of the stands 168, 174. A conventional or typical engine stand usually meets the criteria necessary for a bow stand 168 or stern stand 174. In the preferred embodiment, the stern stand 174 is substantially identical to the bow stand 168.

In a preferred embodiment, the system for mounting, storing, and rotating a personal watercraft which forms the method of use comprises the following steps. The user first attaches the bow mounting section 12 to the bow of the watercraft by positioning the rim of the watercraft at the bow between the top mounting plate 14 and the bottom mounting plate 42 of the bow mounting section assuring that the bow rim is seated over and with the bow lip 54. The user then installs and tightens all the bow bolts 110 and the clamp bolt 98 thereby securely clamping and thereby attaching the bow mounting section 12 to the watercraft. Next the user attaches the bow absorber pad 132 and bow shaft section 112 to the bow base plate 102. This is accomplished by positioning the bow absorber pad 132 between the pad side 106 of the bow base plate 102 and the pad side 128 of the shaft plate 124 and finally attaching the bow base plate 102 to the bow absorber pad 132 and the shaft plate 124 by inserting four pad bolts 120 through the shaft plate holes 130, the pad holes 136 and the bow base plate holes 108 and tightening the associated nuts.

Next the user attaches the stern mounting plate 138 to the stern of the watercraft by positioning the top side 142 of the stern mounting main plate 140 against the hull of the watercraft with the stern rim of the watercraft fitting into the U-shaped portion of the rear plate or channel 150 of the stern mounting plate 138, i.e. the short leg 152 or lip 152 fitting under the stern rim. That is, said main plate 140 fits over the stern while the lip 152 fits under the stern. The next step is to attach the stern absorber pad 166 and stern shaft section 164 to the stern mounting plate 138 as a whole. This is accomplished by positioning the stern absorber pad 166 between the pad side 160 of the stern base plate 156 and the pad side 128 of the stern shaft plate 124 and finally by attaching the stern base plate 156, the stern absorber pad 166 and the shaft plate 124 by inserting four pad bolts 120 through the shaft plate holes 130, the pad holes 136 and the stern base plate holes 162 and tightening the associated nuts. The final step involves mounting the watercraft onto the bow stand 168 and the stern stand 174. This is accomplished by mounting the bow of the watercraft onto the bow stand 168 by inserting the shaft 114 of the bow shaft section 112 into the sleeve 170 or hub of the bow stand 168 and next by mounting the stern of the watercraft onto the stern stand 174 by inserting the shaft 114 of the stern shaft section 164 into the sleeve 170 or hub of the stern stand 174. The aforesaid usually requires mechanically lifting the watercraft with a hoist or jack type device, although several persons may lift each watercraft end to accomplish the same. Once mounted, the watercraft may be translationally secured to the bow and stern stands 168,174 by inserting the removable shaft pins 118 into endmost shaft holes 116 of the shafts 114 of the stern shaft section 164 and the bow shaft section 112. The watercraft may be rotationally secured by placing one or more shaft pins 118 through a sleeve 170 hole and through a shaft hole 116. To rotate the watercraft, the removable shaft pins 118 are removed and the watercraft is rotated to the desired position, the removable shaft pins 118 are then re-inserted to secure the watercraft in position. In a preferred embodiment, the watercraft is rotated by one or two persons. Alternative embodiments include but are not limited to watercraft rotation using electrical power and internal combustion engine power. When placed and secured with the aforesaid pins 118 the user may begin repair or maintenance work upon the watercraft. The user may then remove the watercraft from the apparatus 10 by reversing and repeating the aforesaid steps.

From the foregoing description, those skilled in the art will appreciate that all objects of the present invention are realized. An apparatus and system for mounting, rotating, and holding a personal watercraft and method of utilizing the same in conjunction with a personal watercraft has been shown and described. The apparatus of this invention provides unique benefits which allow a single person to easily work on and manipulate a personal watercraft without damaging the personal watercraft.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. An apparatus for mounting, rotating, and holding a personal watercraft comprising:

a bow mounting section, a stern mounting plate, a bow stand, and a stern stand, said bow mounting section having at least one bow edge shaped to correspond to at least a portion of a shape of a bow of a personal watercraft, said bow mounting section capable of holding said bow and further having at least one front edge opposite said bow edge, said stern mounting plate having a main plate with a rear edge and a front edge and a channel attached with said main plate near said rear edge and shaped to fit with at least a portion of a stern rim of a watercraft; and each of said bow mounting section and said stern mounting plate each having a shaft section mounted with said front edge of said bow mounting section and with said rear edge of said stern mounting plate, said shaft section mounted with said bow mounting section having a shaft extending opposite said bow edge and said shaft section mounted with said stern mounting plate having a shaft extending opposite said front edge; and said bow stand and said stern stand each having a means for rotatably holding said shafts of said bow mounting section and said stern mounting plate respectively, whereby said shafts may each be placed with said means and held above a floor level.

2. The apparatus for mounting, rotating, and holding a personal watercraft as set forth in claim 1 whereby:

said bow mounting section comprises a top mounting plate and a bottom mounting plate, each having the aforesaid bow edge and front edge and each further having an interior side and an exterior side; and further comprising, a clamping section capable of applying a positive force onto each of said exterior sides of said top mounting plate and said bottom mounting plate, whereby each of said plates is drawn toward the other and thereby capable of holding a bow rim of said bow between said bow edges.

3. The apparatus for mounting, rotating, and holding a personal watercraft as set forth in claim 2 further comprising:

a bow lip near said bow edge and on said interior side of said bottom mounting plate, whereby the bow rim is seated over and with said bow lip.

4. The apparatus for mounting, rotating, and holding a personal watercraft as set forth in claim 2 further comprising:

One or more spacers between said top mounting plate and said bottom mounting plate interior sides whereby said spacers limit the minimum distance between said top mounting plate and said bottom mounting plate thereby minimizing damage to said watercraft.

5. The apparatus for mounting, rotating, and holding a personal watercraft as set forth in claim 2 further comprising:

An attached section having a fastener and located near and extending from at least one of said bow edges, whereby said attached section corresponds to a section near a center of the bow rim of the watercraft having a hole; and said fastener sized to fit through the hole in the bow rim.

6. The apparatus for mounting, rotating, and holding a personal watercraft as set forth in claim 3 further comprising:

An attached section having a fastener and located near and extending from said bow edge of said top mounting plate, whereby said attached section corresponds to a section near a center of the bow rim of the watercraft having a hole; and said fastener sized to fit through the hole in the bow rim.

7. The apparatus for mounting, rotating, and holding a personal watercraft as set forth in claim 2 said clamping section further comprising:

a top clamp plate having a top side, a bottom side, one or more posts extending from said bottom side, and a top clamp plate hole; and a bottom clamp plate having a top side, a bottom side, a bottom clamp plate hole, one or more post holes, and one or more post guides, the number of each of said post holes and post guides equivalent to the number of said posts; and said bottom side of the top clamp plate mated with the exterior side of the top mounting plate and said bottom side of the bottom clamp plate mated with the exterior side of the bottom mounting plate and generally aligned with the top clamp plate, and said posts extending through said mounting plates and through said post holes and post guides thereby furthering alignment of all the aforesaid plates; and a clamp bolt extending through said mounting plates and through said clamp plate holes, whereby tightening said bolt creates said positive force.

8. The apparatus for mounting, rotating, and holding a personal watercraft as set forth in claim 2 further comprising:

One or more bolts through said top mounting plate and said bottom mounting plate, whereby tightening said bolts creates said positive force.

9. The apparatus for mounting, rotating, and holding a personal watercraft as set forth in claim 1 wherein one or more of said shaft sections comprise:

one or more base plates having a mount side and a pad side; and one or more shaft plates having a shaft side and a pad side; and one or more absorber pads positioned and held between said pad sides of said base plate and said shaft plate, said shaft extending from said shaft side of said shaft plate and opposite said mount side of said base plate and said one or more shaft sections are mounted on said mount side of said base plate.

10. The apparatus for mounting, rotating, and holding a personal watercraft as set forth in claim 9 wherein:

said absorber pad is held between said pad sides with one or more bolts through said base plate, said shaft plate, and said absorber pad.

11. The apparatus for mounting, rotating, and holding a personal watercraft as set forth in claim 1 wherein:

said channel of said stern mounting plate has a generally "U" shape with a first short leg of said "U" shorter than a second long leg of said "U", said first short leg forming a lip which fits with said stern rim and said second long leg attached with said rear edge of said main plate.

12. The apparatus for mounting, rotating, and holding a personal watercraft as set forth in claim 2 wherein:

said channel of said stern mounting plate has a generally "U" shape with a first short leg of said "U" shorter than a second long leg of said "U", said first short leg forming a lip which fits with said stern rim and said second long leg attached with said rear edge of said main plate.

13. The apparatus for mounting, rotating, and holding a personal watercraft as set forth in claim 3 wherein:

said channel of said stern mounting plate has a generally "U" shape with a first short leg of said "U" shorter than a second long leg of said "U", said first short leg forming a lip which fits with said stern rim and said second long leg attached with said rear edge of said main plate.

14. The apparatus for mounting, rotating, and holding a personal watercraft as set forth in claim 5 wherein:

said channel of said stern mounting plate has a generally "U" shape with a first short leg of said "U" shorter than a second long leg of said "U", said first short leg forming a lip which fits with said stern rim and said second long leg attached with said rear edge of said main plate.

15. The apparatus for mounting, rotating, and holding a personal watercraft as set forth in claim 9 wherein:

said channel of said stern mounting plate has a generally "U" shape with a first short leg of said "U" shorter than a second long leg of said "U", said first short leg forming a lip which fits with said stern rim and said second long leg attached with said rear edge of said main plate.

16. The apparatus for mounting, rotating, and holding a personal watercraft as set forth in claim 1 whereby:

said means for rotatably holding said shafts comprises one or more hubs attached to said stands.

17. An apparatus for mounting, rotating, and holding a personal watercraft comprising:

a bow mounting section, a stern mounting plate, a bow stand, and a stern stand, said bow mounting section having a top mounting plate and a bottom mounting plate, each having a bow edge, a front edge, an interior side, and an exterior side, a least a portion of said bow edge of said top mounting plate shaped to correspond to at least a portion of a shape of a bow of a watercraft; and a bow lip near said bow edge and on said interior side of said bottom mounting plate, said bow lip shaped to seat with a bow rim of the bow and clamp the bow rim in conjunction with said top mounting plate on the interior sides of said top and bottom mounting plates; and a clamping section capable of applying a positive force onto each of said exterior sides of said top mounting plate and said bottom mounting plate, whereby each of said plates is drawn toward the other; and said stern mounting plate having a main plate with a rear edge and a front edge and a channel, said channel of said stern mounting plate having a generally "U" shape with a first short leg of said "U" shorter than a second long leg of said "U", said first short leg forming a lip sized to fit with a stern rim and said second long leg attached with said rear edge of said main plate, said short leg lip further sized to fit under the stern rim when said main plate fits over a stern of the watercraft; and a first shaft section and a second shaft section, each of said shaft sections having a shaft plate with an extending shaft and an absorber pad between said shaft plate and a base plate, said base plate of said first shaft section mounted with said front edge of said bow mounting section and said base plate of said second shaft section mounted with said rear edge of said stern mounting plate; and said bow stand and said stern stand each having a means for holding said shafts of said bow mounting section and said stern mounting plate respectively, whereby said shafts may each be placed with said means and held above a floor level.

* * * * *